(12) United States Patent
Cook

(10) Patent No.: US 10,648,235 B2
(45) Date of Patent: May 12, 2020

(54) WORK STAND CONFIGURABLE FOR DIFFERENT WORK AREAS

(71) Applicant: The Boeing Company, Chicago, IL (US)

(72) Inventor: Rebecca L. Cook, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 15/237,290

(22) Filed: Aug. 15, 2016

(65) Prior Publication Data

US 2018/0044986 A1 Feb. 15, 2018

(51) Int. Cl.
| | | |
|---|---|---|
| *B64F 5/00* | (2017.01) | |
| *E04G 5/14* | (2006.01) | |
| *E06C 5/00* | (2006.01) | |
| *E06C 7/18* | (2006.01) | |
| *E04H 17/00* | (2006.01) | |
| *E04G 1/34* | (2006.01) | |
| *E06C 1/39* | (2006.01) | |
| *E04G 5/10* | (2006.01) | |
| *E06C 1/10* | (2006.01) | |
| *E06C 1/397* | (2006.01) | |
| *E06C 1/52* | (2006.01) | |
| *E04G 1/24* | (2006.01) | |

(52) U.S. Cl.
CPC ............... *E06C 7/182* (2013.01); *B64F 5/00* (2013.01); *E04G 1/34* (2013.01); *E04G 5/10* (2013.01); *E04G 5/142* (2013.01); *E04H 17/00* (2013.01); *E06C 1/10* (2013.01); *E06C 1/39* (2013.01); *E06C 1/397* (2013.01); *E06C 7/183* (2013.01); *E04G 2001/242* (2013.01); *E06C 1/52* (2013.01)

(58) Field of Classification Search
CPC .......... E04H 6/04; E04H 17/18; E04H 17/00; A01K 3/00; A01K 3/002; A01K 1/0035; E01D 19/106; B60P 3/34; E06C 7/182; E06C 7/16; E06C 5/32; E06C 5/36; E06C 1/397; E06C 1/10; E06C 1/39; E06C 1/183; E06C 1/52; E04G 5/14; E04G 5/142; E04G 21/3204; E04G 21/32; E04G 1/34; E04G 2001/157; E04G 5/10; E04G 2001/242; B62B 2206/006; B62B 3/02; B62B 3/022; B62B 11/00; A47B 31/00; E05D 11/1007; B64F 5/00
USPC .......................................................... 256/56
See application file for complete search history.

(56) References Cited

U.S. PATENT DOCUMENTS

| | | | | |
|---|---|---|---|---|
| 1,034,461 | A * | 8/1912 | Johnson .................. | E04H 17/18 256/26 |
| 2,766,017 | A * | 10/1956 | Cote ....................... | E04H 17/18 256/23 |
| 3,082,843 | A * | 3/1963 | Henderson .............. | E04G 5/045 182/82 |
| 3,204,606 | A * | 9/1965 | Parr ....................... | A01K 1/0005 119/514 |

(Continued)

*Primary Examiner* — Daniel P Cahn
(74) *Attorney, Agent, or Firm* — Walters & Wasylyna LLC

(57) ABSTRACT

A mobile work stand for working on work areas including a fence. The fence includes a plurality of adjacent first and second fence sections that are pivotally connected to each other to enable the fence to be configurable in different fence positions. Each fence position is configured to enclose a different configured work area.

20 Claims, 9 Drawing Sheets

(56) References Cited

U.S. PATENT DOCUMENTS

| | | | |
|---|---|---|---|
| 3,726,256 A * | 4/1973 | Bernhardt | A01K 3/00 119/512 |
| 3,921,585 A * | 11/1975 | Hall | A01K 3/00 119/512 |
| 4,537,151 A * | 8/1985 | Bolton | A01K 3/00 119/512 |
| 4,538,379 A | 9/1985 | Vargo | |
| 4,679,657 A * | 7/1987 | Bennett | B65G 69/22 182/1 |
| D349,611 S * | 8/1994 | Kipperman | D6/361 |
| 5,353,892 A * | 10/1994 | Lu | E06C 1/32 16/328 |
| 5,620,272 A * | 4/1997 | Sheng | E05D 11/1007 182/163 |
| 5,624,199 A * | 4/1997 | Cheng | A47D 13/063 403/100 |
| 5,651,333 A * | 7/1997 | Fisher | A01K 1/0613 119/734 |
| 5,967,258 A * | 10/1999 | Scott | B66F 11/044 182/112 |
| 6,123,321 A | 9/2000 | Miller | |
| 6,152,264 A * | 11/2000 | Gaines, Sr. | B66F 11/046 182/141 |
| 6,360,668 B1 | 3/2002 | Rauch | |
| 6,390,152 B1 * | 5/2002 | Donovan | B65G 69/22 137/615 |
| 6,772,860 B1 * | 8/2004 | Nelson | E04G 1/24 182/115 |
| 7,036,798 B1 * | 5/2006 | Olson | E01F 7/025 239/289 |
| 7,216,853 B2 * | 5/2007 | Wall | E04H 17/16 256/24 |
| 7,739,983 B2 | 6/2010 | Hirokawa et al. | |
| 8,662,251 B2 * | 3/2014 | Hansen | B60P 1/00 182/113 |
| 8,746,403 B1 * | 6/2014 | Tyner | E06C 1/30 182/106 |
| 9,103,080 B2 * | 8/2015 | Jolicoeur | E01D 19/106 |
| 9,133,014 B2 * | 9/2015 | Kenan | B67D 7/40 |
| 9,226,476 B2 * | 1/2016 | Wilson | A01K 3/00 |
| 9,458,645 B1 * | 10/2016 | King | E04H 17/14 |
| 9,486,691 B1 * | 11/2016 | McGee | A61B 71/022 |
| 9,783,939 B2 * | 10/2017 | Jolicoeur | E01D 19/106 |
| 2005/0103569 A1 | 5/2005 | Winter | |
| 2005/0217936 A1 * | 10/2005 | Jolicoeur | E01D 19/106 182/130 |
| 2006/0054392 A1 * | 3/2006 | MacDonald | B66F 11/04 182/113 |
| 2007/0051559 A1 * | 3/2007 | Brown | B66F 11/042 182/63.1 |
| 2007/0262567 A1 * | 11/2007 | Benson | B62B 3/008 280/656 |
| 2009/0114128 A1 * | 5/2009 | Lombardi | B66F 11/046 108/54.1 |
| 2010/0294592 A1 * | 11/2010 | Crook | B66F 11/044 182/113 |
| 2010/0307868 A1 * | 12/2010 | Bennett | B61K 13/00 182/36 |
| 2011/0073409 A1 * | 3/2011 | Ricci | B63C 5/02 182/62.5 |
| 2011/0088971 A1 * | 4/2011 | Jaffe | E06C 1/10 182/21 |
| 2011/0127111 A1 * | 6/2011 | Bennett | E06C 5/02 182/113 |
| 2011/0253476 A1 * | 10/2011 | Earl | B66F 7/02 182/69.6 |
| 2011/0303488 A1 * | 12/2011 | Besselink | B66F 11/04 182/142 |
| 2012/0024629 A1 * | 2/2012 | Berry, Jr. | B60R 3/005 182/113 |
| 2012/0073902 A1 * | 3/2012 | Honeycutt | E04F 11/025 182/113 |
| 2012/0204362 A1 * | 8/2012 | Honeycutt | E01D 15/24 14/71.3 |
| 2013/0152867 A1 * | 6/2013 | Kaneda | A01K 1/034 119/502 |
| 2013/0256058 A1 * | 10/2013 | Borghi | B66F 11/04 182/113 |
| 2014/0034418 A1 * | 2/2014 | Olea Porcel | B66F 11/04 182/2.1 |
| 2014/0144724 A1 * | 5/2014 | St-Germain | B66F 11/04 182/69.6 |
| 2014/0345976 A1 * | 11/2014 | Grumberg | E01D 19/106 182/223 |
| 2015/0041252 A1 * | 2/2015 | Grumberg | E04C 3/09 182/130 |
| 2015/0184403 A1 * | 7/2015 | Jolicoeur | E01D 19/106 182/150 |
| 2015/0211298 A1 * | 7/2015 | Rogers | E06C 1/397 182/21 |
| 2015/0292224 A1 * | 10/2015 | Ginther | E04H 6/04 52/67 |
| 2016/0047141 A1 * | 2/2016 | Juett | E04H 17/18 256/25 |
| 2016/0145939 A1 * | 5/2016 | Smith | E06C 1/393 182/113 |
| 2016/0257543 A1 * | 9/2016 | Hufnagl | B66F 11/044 |
| 2017/0081161 A1 * | 3/2017 | Iotti | B66F 9/127 |
| 2017/0101297 A1 * | 4/2017 | Claypool | B60M 1/28 |
| 2017/0101791 A1 * | 4/2017 | Harmon | B66F 11/04 |
| 2017/0137254 A1 * | 5/2017 | Becker | B65H 75/425 |
| 2017/0198484 A1 * | 7/2017 | Grumberg | E04G 1/34 |
| 2017/0292349 A1 * | 10/2017 | Toma | E21B 41/00 |
| 2018/0030679 A1 * | 2/2018 | Jolicoeur | E01D 19/106 |

* cited by examiner

WORK STAND CONFIGURABLE FOR DIFFERENT WORK AREAS

FIELD

This application relates to mobile work stands, and in particular, a mobile tooling work stand that implements a configurable safety fence for working safely in a variety of work areas.

BACKGROUND

In servicing or working in work areas that are high, such as a wing on an airplane, fall restraint devices are used to prevent the servicer from falling off the work area. One fall restraint device is a lanyard that is attached to the servicer working on the work area. However, the disadvantages with the use of a lanyard are that the servicer's freedom of movement in the work area is reduced by the lanyard, the continually adjusting of the lanyard can become too cumbersome, and the lanyard has to be secured to the servicer while the servicer is unprotected from falling from the work area. Additionally, there have been multiple instances of the attachment method for the lanyard failing. For example, due to the need to be able to navigate to and within a variety of different work areas, a suction pad is often implemented as the method of securing the lanyard to the work area. These devices have been known to lose pressure and fail. Due to these and other reasons, there has been a push to completely eliminate the use of lanyards to prevent a servicer from falling.

Another fall restraint device is a tooling work stand. The tooling work stand may also be used in conjunction with a suction pad playpen work area. However, one issue with the tooling work stand is the extreme cost associated with designing and purchasing a tooling stand for every particular work area. Another issue is that even with this installed playpen area, the installer must exit the work stand and install the sections while tied in to a lanyard attached to a suction pad. Further, even with these tooling stands, the installer must exit the work stand and use lanyards tied off to a suction pad to install fence panels attached to suction pads, while sometimes having to implement overhead cranes to install these fence panels.

SUMMARY

In one embodiment, a mobile work stand for working on work areas includes an attached, configurable safety fence that may be positioned to extend out over a work area at a height that in itself has a workable surface for standing or kneeling. As opposed to the work stand providing the working surface, the work area itself provides the working surface and the configurable safety fence provides the fall elimination guarding around the work area. The fence includes adjacent fence sections that are pivotally connected to each other to enable the fence to be configurable in different fence positions depending on the specific work area. The number of fence panels may be more or less for each stand depending on the size of the configurable area needed. Each fence position is configured to enclose a different configured work area.

In one embodiment, a fence for a mobile work stand configured for allowing access to work areas is provided. The fence includes adjacent first and second fence sections pivotally connected to each other to enable the fence to be configurable in different fence positions. Each custom fence positioning allows the system to enclose a different work area. The fence includes a locking mechanism operatively connected to the adjacent sections of fencing that pivot off of each other. The locking mechanism is configured to lock each two adjacent fence panel sections at selected pivot angles with respect to each other. Through this method, any desired shape work area may be achieved within the fencing and locked securely in that position until the work is completed and the stand may be removed.

In another embodiment, a method for using a mobile work stand for working on work areas, wherein the mobile work stand includes a fence having adjacent first and second fence sections pivotally connected to each other. The method includes positioning the mobile work stand at the work area, and configuring the fence in a first position to enclose the work area by pivoting the first and second fence sections at selected pivot angles with respect to each other.

Other embodiments of the disclosed mobile work stand will become apparent from the following detailed description, the accompanying drawings and the appended claims.

DETAILED DESCRIPTION

Figure 1:
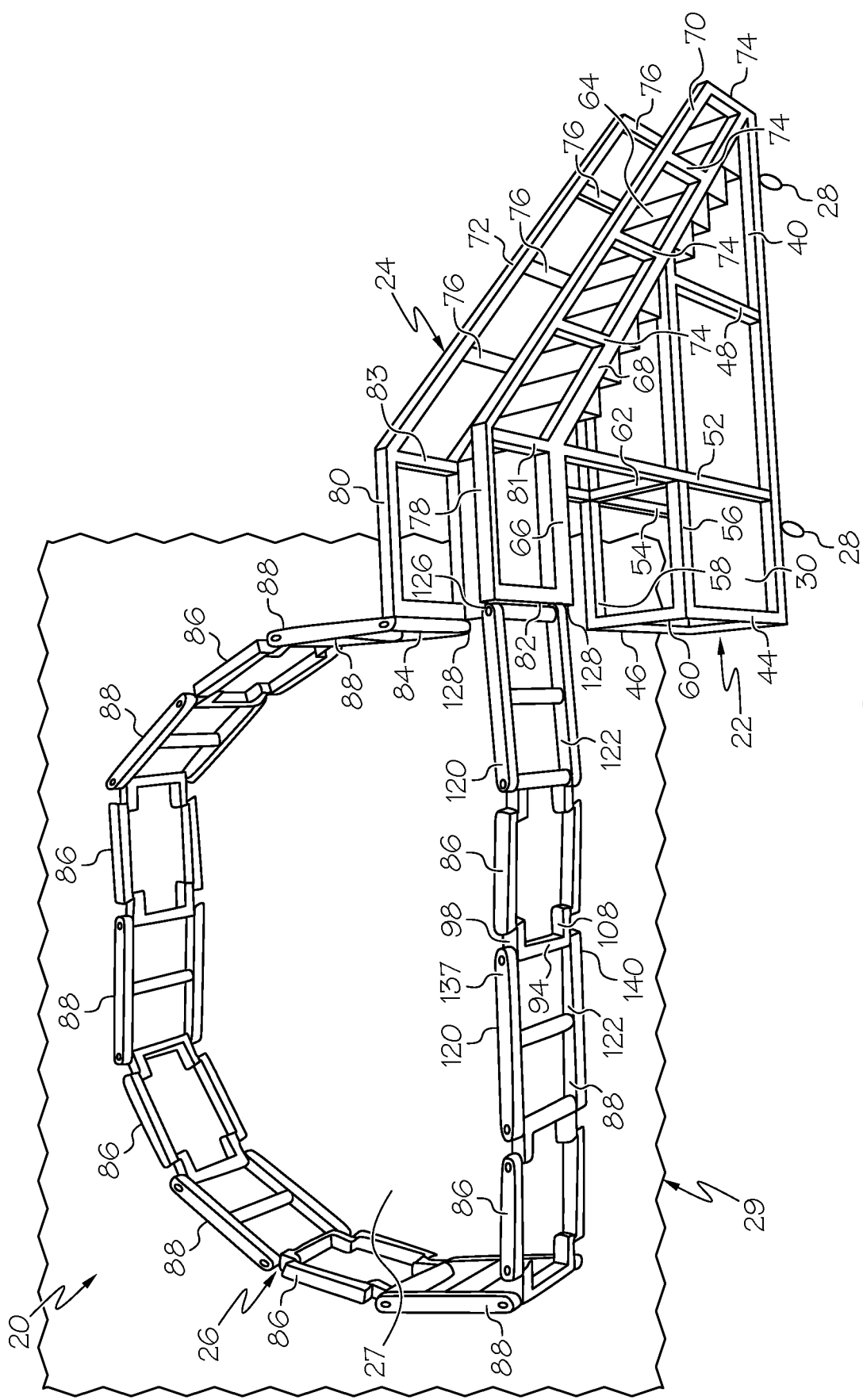
FIG. 1 is a front and top perspective view of the mobile work stand according to one embodiment.
Figure 2:
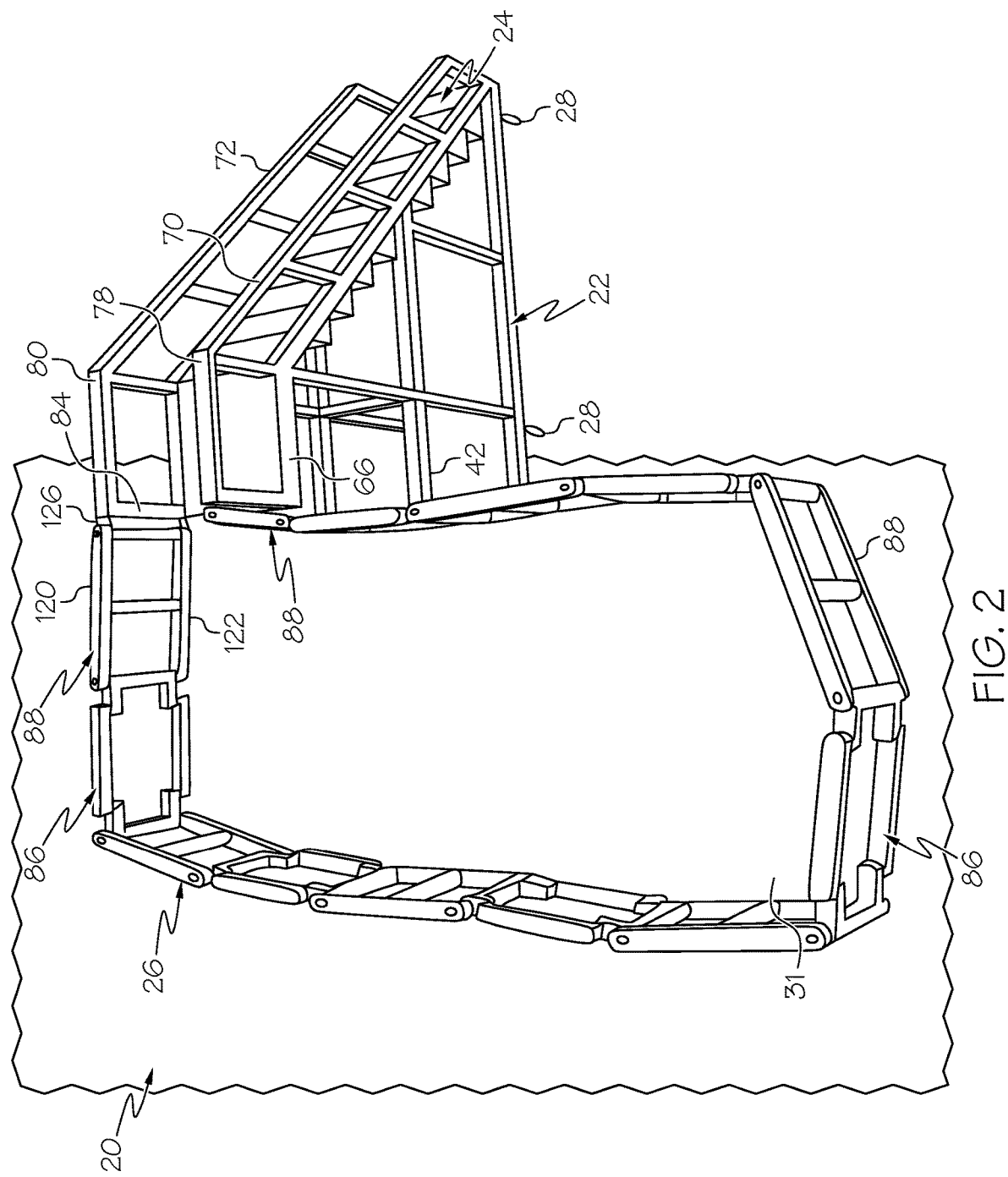
FIG. 2 is a front and top perspective view of the mobile work stand of the embodiment of FIG. 1 but with the fence configured in a different position.
Figure 3:
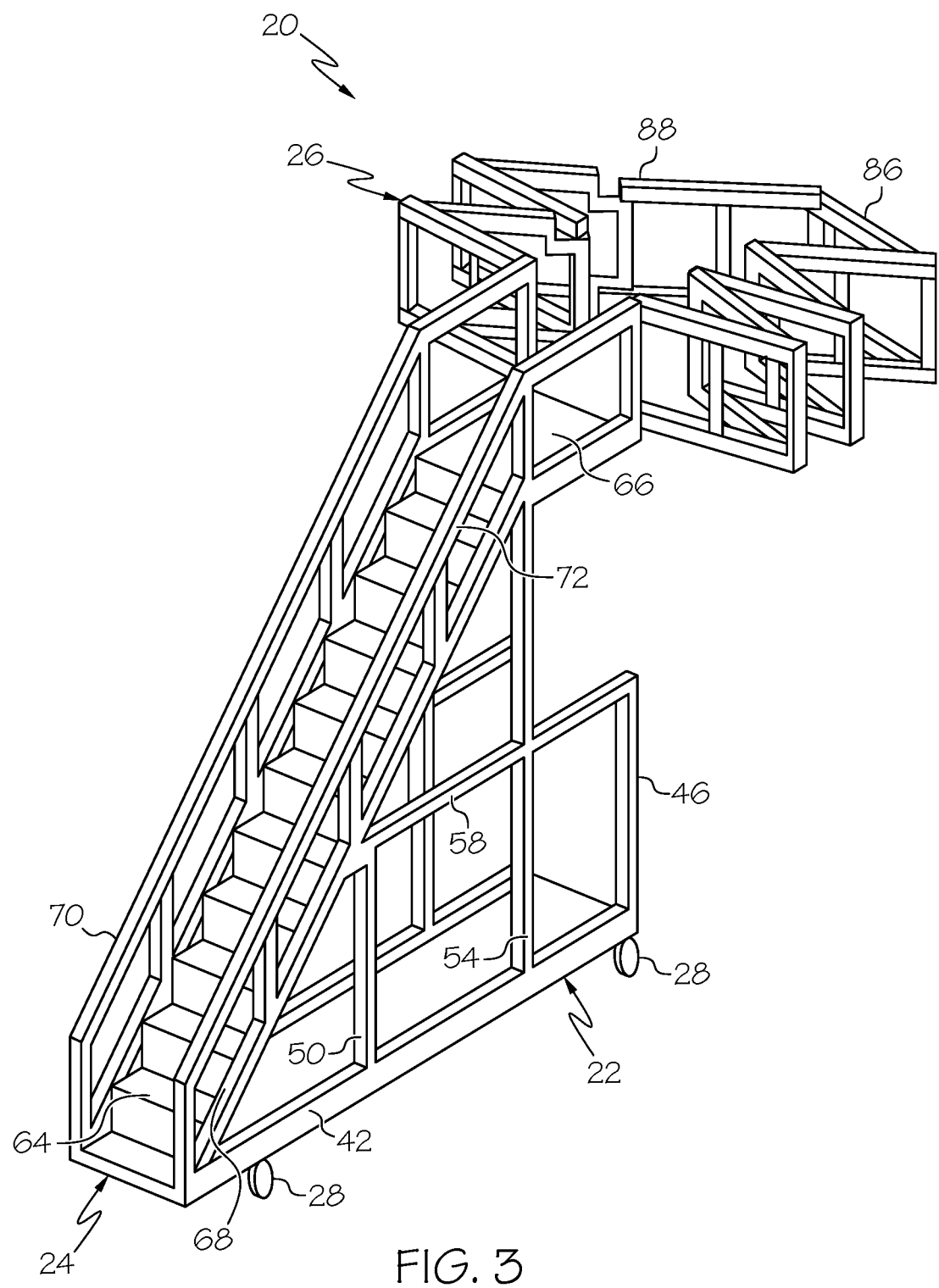
FIG. 3 is a schematic rear and top perspective view of the mobile work stand of the embodiment of FIG. 1 with the fence configured in a stowed position.

FIGS. 1-3 illustrates a mobile work stand 20 for enabling a servicer to work on work areas. The mobile work stand 20 comprises a base 22, a staircase 24, and a fence 26. The mobile work stand may include wheels 28 to assist it in moving it to the work areas. The work stand 20 may be used for servicing work areas in aerospace applications or non-aerospace applications, without departing from the scope of the present disclosure. The work area 27 may be for example, an area on a wing 29 or other part of an airplane.

The base 22 of the mobile work stand 20 includes a bottom wall 30. The bottom wall 30 is generally flat and rectangular in shape. Front and rear horizontal support members 40, 42 (viewed in FIGS. 1 and 2) are mounted on the bottom wall 30. A first pair of front and rear vertical posts 44, 46 are mounted on their respective front and rear support members 40, 42 near the left end (viewed in FIG. 1) of the bottom wall 30. A second pair of front and rear vertical posts 48, 50 (FIG. 3) of equal height as the first pair and are mounted on their respective front and rear support members 40, 42 near the right end of the bottom wall 30. A third pair of front and rear vertical posts 52, 54 are mounted on their respective front and rear support members 40, 42 between the first and second pair of vertical posts 44, 46, 48, 50. The third pair of vertical posts 52, 54 have a height that is greater that the first and second pair of vertical posts 44, 46, 48, 50. A front horizontal rail 56 is mounted on top of the front vertical posts 44, 48 and extends between them. A rear horizontal rail 58 is mounted on top of the rear vertical posts 46, 50 and extends between them. Horizontal cross bars 60, 62 extend between the front and rear rails 56, 58 at the location of the first and third pair of vertical posts 44, 46, 52, 54. The base 22 provides support to the staircase 24 and the fence 26. The height of the base 22 may be adjustable to adjust the height of the mobile work stand 20. The base 22 may be formed of a suitable material to provide support to the staircase 24 and the fence 26 such as wood, plastic, metal, and combinations thereof.

The staircase 24 includes treads or steps 64 that collectively run upwardly and leftward from the right end of the base 22 and terminate into a top platform 66. The steps 64 and top platform 66 are supported by a frame 68. A first pair of front and rear hand rails 70, 72 are supported by corresponding front and rear vertical support posts 74, 76 that are mounted to the portion of the frame 68 along the steps 64. A second pair of horizontal front and rear handrails 78, 80 are supported by corresponding front and rear vertical support posts 81, 82, 83, 84 that are mounted to the portion of the frame 68 at the top platform 66. The staircase 24 is supported by the vertical posts 48, 50, 52, 54 of the base 22. The staircase 24 may be formed of a suitable material to support a servicer. This material may be wood, plastic, metal, and combinations thereof.

Figure 4:
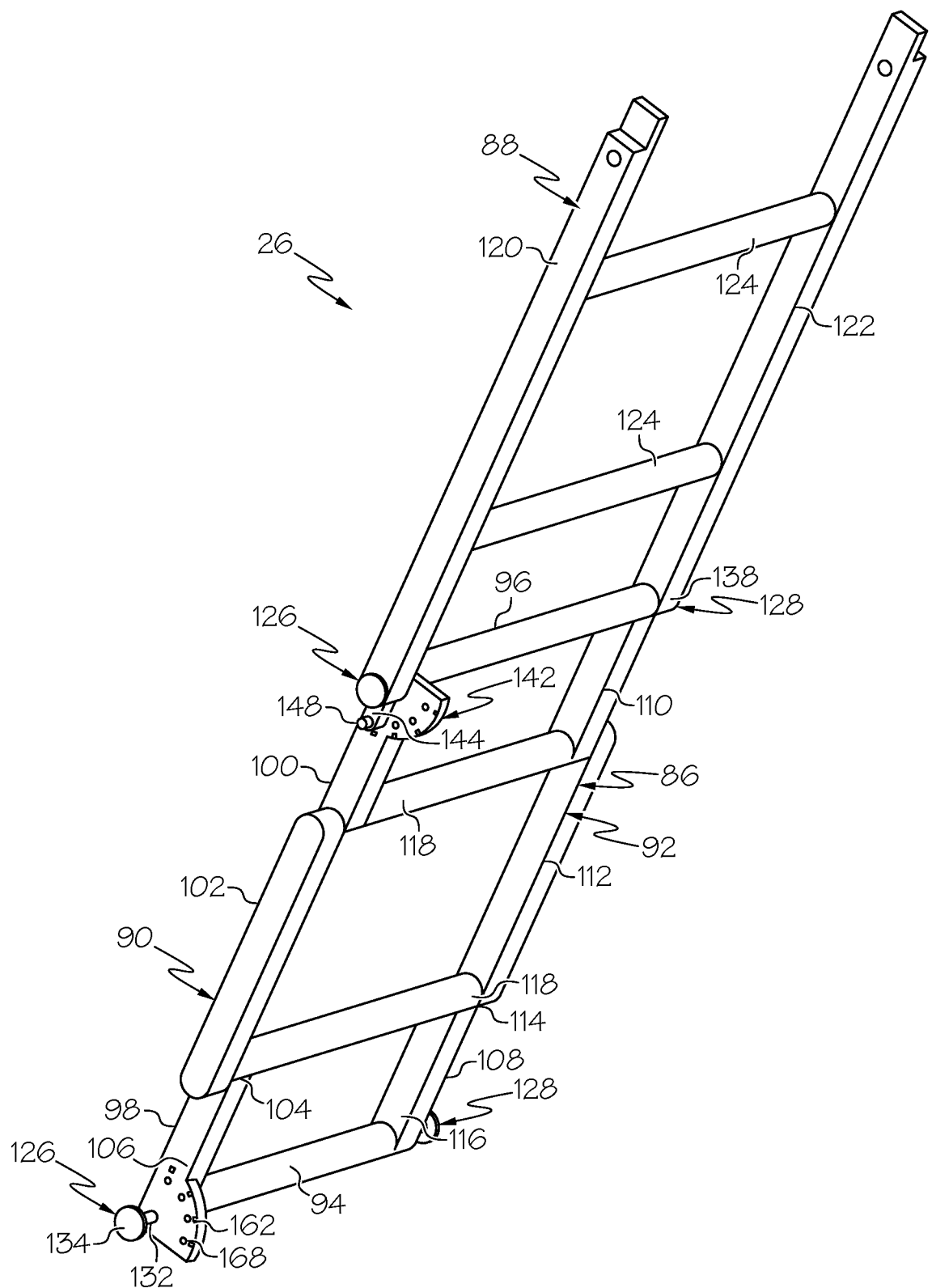
FIG. 4 is a perspective view of a portion of the fence of FIG. 1 showing the locking mechanism locking the first and second fence sections at a first pivot angle relative to each other.

The fence 26 comprises a plurality of first and second adjacent fence sections 86, 88. Referring to FIG. 4, each first fence section 86 includes horizontal top and bottom portions 90, 92 that are interconnected by outer vertical posts 94, 96. The top portion 90 includes two outer members 98, 100 and an inner member 102. Each of the outer members 98, 100 includes an inner portion 104 and an outer portion 106. The inner member 102 is mounted on top of the inner portions 104 of the outer members 98, 100 and extends between them. The bottom portion 92 includes two outer members 108, 110 and an inner member 112. Each of the outer members 108, 110 includes an inner portion 114 and an outer portion 116. The inner member 112 is mounted on the underside of the inner portions 114 of the outer members 108, 110 and extends between them. Optionally, vertical posts 118 can be provided between vertically opposite inner portions 104, 114 of the outer members 98, 100, 108, 110 of the top and bottom portions 90, 92 to provide additional support to the first fence section 86 as seen in FIG. 4. Each second fence section 88 includes horizontal top and bottom rails 120, 122 that are supported and interconnected by an inner vertical post 124 and the outer vertical posts 94, 96 (see also FIG. 1). An additional inner vertical post 124 may be provided to further support the top and bottom rails 120, 122, as seen in FIG. 4. The inner member 102 of the top portion 90 is at the same height as the top rail 120, and the inner member 112 of the bottom portion 92 is at the same height as the bottom rail 122.

Figure 5:
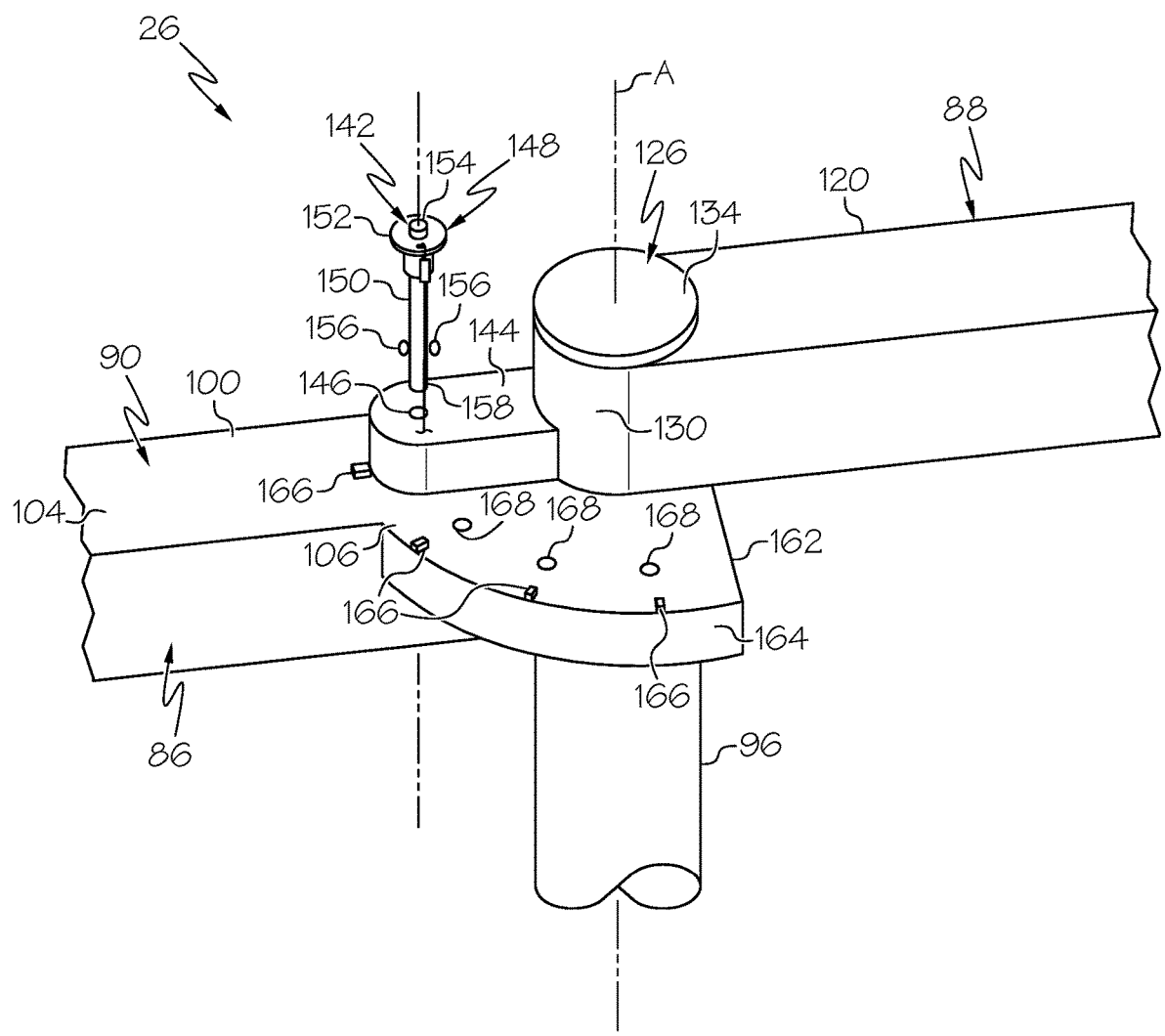
FIG. 5 is a partial exploded view of a portion of the fence of FIG. 4 showing the locking mechanism.

The adjacent first and second fence sections 86, 88 are pivotally connected together by upper and lower hinge pins 126, 128. This enables the first and second fence sections 86, 88 to pivot relative to each other about vertical axis A (FIG. 5), and thus, allow various configurations or positions of the fence to enclose different configured work areas, as illustrated in FIGS. 1 and 2. Specifically, as depicted in FIGS. 4 and 5, one end 130 of the top rail 120 of the second fence section 88 is positioned upon the outer portion 106 of the outer member 100 of the top portion 90, which in turn is positioned upon the top of the outer vertical post 96. A shaft 132 (FIG. 4) of the upper hinge pin 126 slidably extends through the top rail 120 and outer portion 106, and a head 134 of the upper hinge pin 126 is positioned above or on the top of the top rail 120. As seen in FIGS. 1 and 2, the other end 137 of the top rail 120 of the second fence section 88 is positioned upon the outer portion 106 of the outer member 98 of the top portion 90, which in turn is positioned upon the top of the outer vertical post 94. The shaft 132 of the upper hinge pin 126 slidably extends through the top rail 120 and outer portion 106, and the head 134 of the upper hinge pin 126 is positioned above or on the top of the top rail 120.

Likewise, as best seen in FIGS. 1, 2, and 4, one end 138 (FIG. 4) of the bottom rail 122 of the second fence section 88 is positioned on the underside of the outer portion 11611 of the outer member 110 of the bottom portion 92, which in turn is positioned on the underside of the outer vertical post 96. A shaft 132 of the lower hinge pin 128 slidably extends through the bottom rail 122 and outer portion 106, and a head 134 of the lower hinge pin 128 is positioned under or on the underside of the bottom rail 122. Referring to FIG. 1, the other end 140 of the bottom rail 122 of the second fence section 88 is positioned on the underside of the outer portion 116 of the outer member 108 of the bottom portion 92, which in turn is positioned on the underside of the outer vertical post 94. The shaft 132 of the lower hinge pin 128 (FIG. 4) slidably extends through the bottom rail 122, outer portion 106, and outer vertical post 94, and the head 134 of the lower hinge pin 128 is positioned under or on the underside of the bottom rail 122.

As seen in FIGS. 1 and 2, the fence 26 is also pivotally mounted via the second fence sections 88 to the front and rear support posts 82, 84 of the platform 66 and extends from the front support post 82 to the rear support post 84 in alternating first and second fence sections 86, 88 to enclose the work area 27. Referring to FIG. 1, the top rail 120 of the second fence section 88 adjacent the front support post 82 is positioned on top of the front support post 82. The shaft 132 of the upper hinge pin 126 extends through the top rail 120 and front support post 82, and the head 134 of the upper hinge pin 126 is positioned above or on the top of the top rail 120. The bottom rail 122 of that second fence section 88 is positioned under or on the underside of the front support post 82. The shaft 132 of the lower hinge pin 128 extends through the bottom rail 122 and front support post 82, and the head 134 of the lower hinge pin 128 is positioned under or on the underside of the bottom rail 122. Similarly, with reference to FIG. 2, the top rail 120 of the second fence section 88 adjacent the rear support post 84 is positioned on top of the rear support post 84. The shaft 132 of the upper hinge pin 126 extends through the top rail 120 and rear support post 84, and the head 134 of the upper hinge pin 126 is positioned above or on the top of the top rail 120. The bottom rail 122 of that second fence section 88 is positioned under or on the underside of the rear support post 84. The shaft 132 of the lower hinge pin 128 (FIG. 1) extends through the bottom rail 122 and rear support post 84, and the head 134 of the lower hinge pin 128 is positioned under or on the underside of the bottom rail 122. The fence 26 may be formed of a suitable material to restrain a servicer from falling off the work area 27. This material may be wood, plastic, metal, and combinations thereof.

Figure 6:
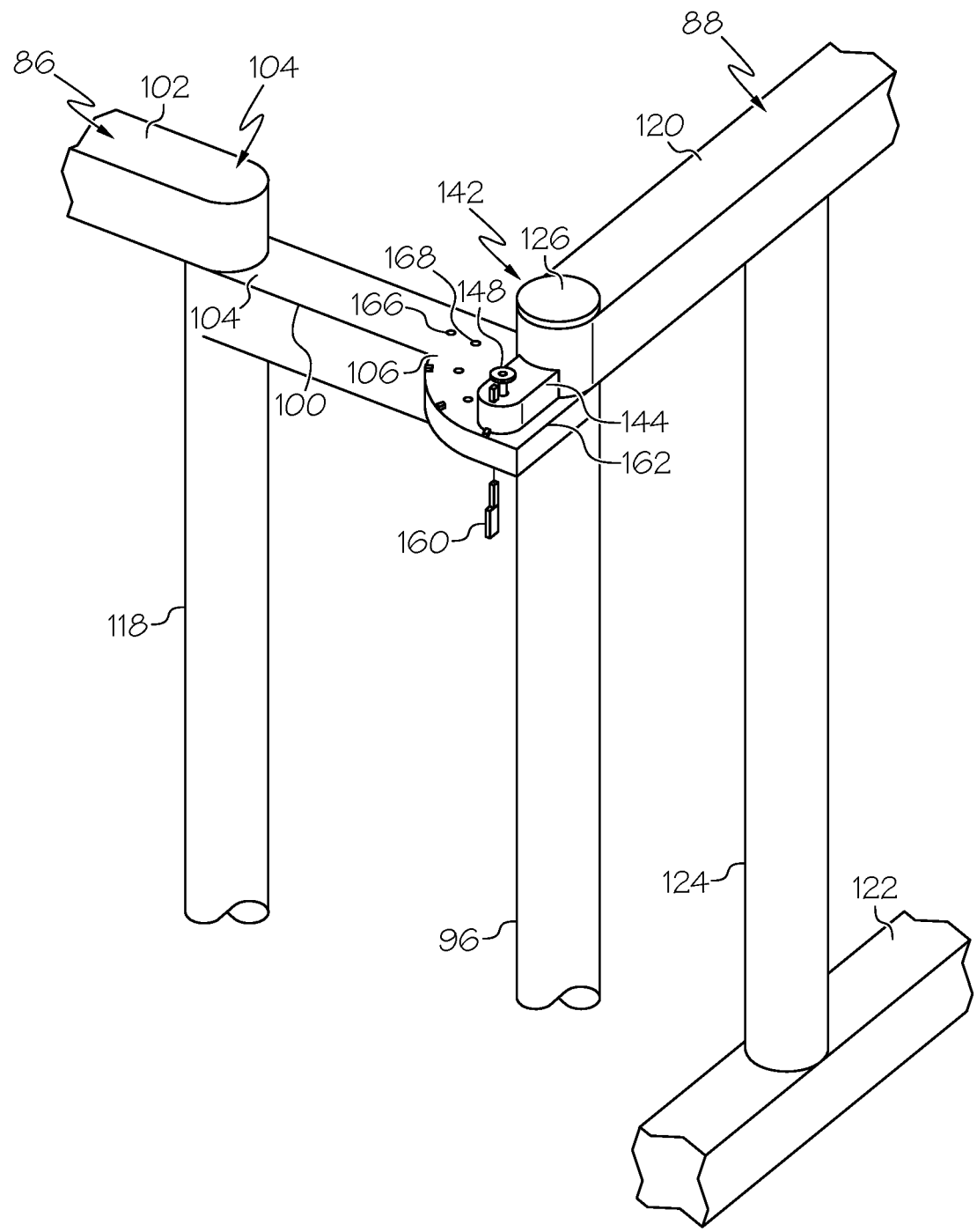
FIG. 6 is a perspective view of a portion of the fence of FIG. 1 showing the locking mechanism locking the first and second fence sections at a second pivot angle relative to each other.

The fence 26 may include a locking mechanism 142 (FIGS. 4-6) to lock the adjacent first and second fence sections 86, 88 at selective angular positions with respect to each other. For example, FIG. 4 shows adjacent first and second fence sections 86, 88 locked at one hundred and eighty degrees with respect to each other, and FIG. 6 shows adjacent first and second fence sections 86, 88 locked at ninety degrees with respect to each other. In particular, as seen in FIG. 5, the locking mechanism 142 includes an invert u-shaped upper locking plate 144. The upper locking plate 144 is fixed to the end (130 or 137) of the top rail 120 and includes a pin receiving aperture 146. The locking mechanism 142 further includes a push button quick release locking pin assembly 148. The locking pin assembly 148 includes a stainless steel shaft 150 and an aluminum handle 152 that fits over the top of the shaft 150. A push button 154 is spring loaded into the center of the handle 152 and is operatively connected to lateral balls 156 that are located on opposite sides of the shaft 150 and extend and retract laterally in the shaft 150. When the push button 154 is not pressed, the lateral balls 156 laterally extend out of the shaft 150. When the push button 154 is pressed, the balls 156 retract into the shaft 150. The locking pin assembly 148 further includes a plastic coated stainless steel lanyard 158 with an aluminum plate 1609 FIG. 6) that is attached to the handle 152 for securing the locking pin assembly 148 to the fence 26 even when the locking pin assembly 148 is not being used to lock the first and second fence sections 86, 88 together.

The locking mechanism 142 further includes a flange member 162 that is integrally formed in one piece with the outer member (98 or 100) of the top portion 90 of the first fence section 86. Specifically, the flange member 162 extends radially outward (relative to the periphery of the fence) from the periphery of the outer member (98 or 100). The flange member 162 includes a convexly curved outer end 164. The locking mechanism 142 includes a series of lanyard receiving bores 166 that are formed in the flange member 162 adjacent the curved outer end 164 and also in the outer member (98 or 100). The locking mechanism 142 also includes a series of pin receiving bores 168 that are formed in the flange member 162 and outer member (98 or 100) and located radially inward (relative to the curved outer end 164) from the lanyard receiving bores 166. The pin receiving bores 168 are arranged in a curved line that is parallel to the curved outer end 164. The locking plate 144 is positioned with respect to the flange member 162 such that pivotal movement of the second fence section 88 relative to the first fence section 86 enables the pin receiving aperture 146 to align with any one of the pin receiving bores 168 depending on the pivot angle between the adjacent first and second fence sections 86, 88.

The locking mechanism 142 operates to lock the adjacent first and second fence sections 86, 88 at selected pivot angles with respect to each other, thereby enabling various fence configurations to enclose a variety of work areas. In the locked position (FIG. 6), the shaft 150 of the locking pin assembly 148 extends through the aligned pin receiving aperture 146 of the locking plate 144 and the selected one of the pin receiving bores 168 of the flange member 162 to lock the first and second fence sections 86, 88 together in a first position that corresponds to the selected pin receiving bore 168. Also, in the locked position, the balls 156 of the locking pin assembly 148 engage the underside of the flange member 162 and the handle 152 engages the top of the locking plate 144 to prevent removal of the locking pin assembly 148 from the aligned pin receiving aperture 146 of the lock plate and the selected pin receiving bore 168. The lanyard 158 extends through one of the lanyard receiving bores 166 such that the aluminum plate 160 is under the flange member 162 to prevent removal of the pin assembly 148 from the fence 26 should the locking pin assembly 148 be removed from the aligned pin receiving aperture 146 of the locking plate 144 and the selected pin receiving bore 168 of the flange member 162. Alternatively, the flange member may extend completely around the outer member (98 or 100) and include further pin receiving bores 168 to enable more pivot angles between the adjacent first and second fence sections 86, 88 to be selected.

Figure 7:
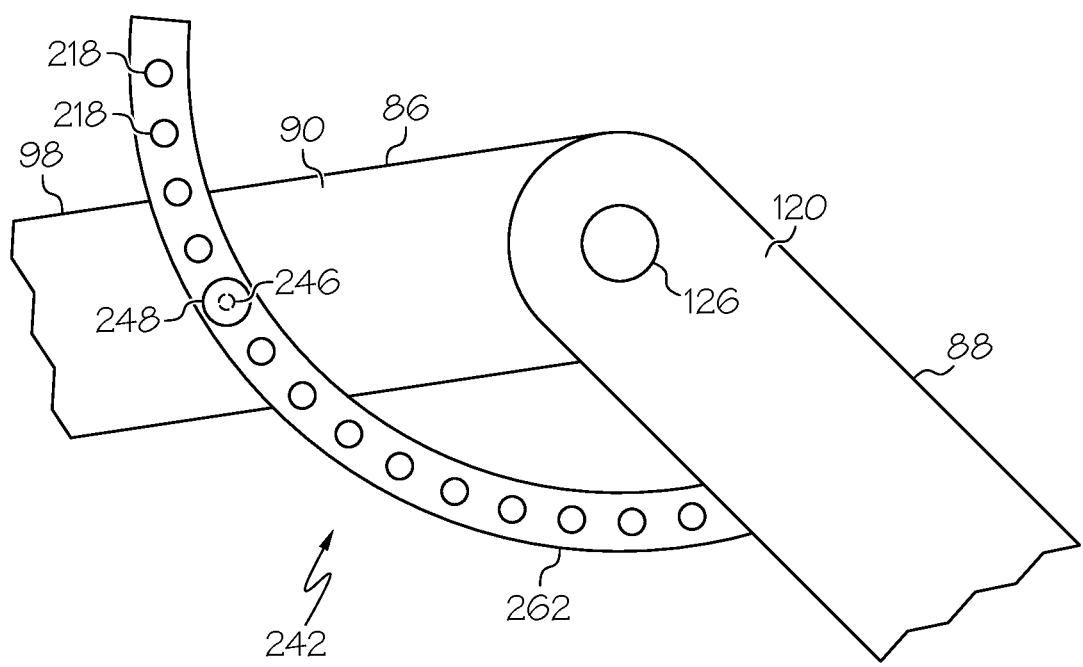
FIG. 7 is a top plan view of a portion of a fence of the mobile work stand having an alternative locking mechanism.

Alternative locking mechanisms may be used to lock the first and second fence sections 86, 88 together at selected pivot angles. For example, as shown in FIG. 7, the locking mechanism 242 may include a curved extension member 262 that is fixed to the top rail 120 of the second fence section 88 and extends outwardly from the top rail 120. A series of pin receiving bores 268 are formed along the length of the extension member 262. The outer member (98 or 100) of the top portion 90 of the first fence section 86 includes a pin receiving aperture 246, which when aligned with a selected pin receiving bore corresponds to a selected pivot angle between the adjacent first and second fence sections. The extension member 262 extends over the pin receiving aperture 246 such that pivotal movement of the second fence 88 section relative to the first fence section 86 enables the pin receiving aperture 246 to align with any one of the pin receiving bores 268. A locking pin assembly 248, such as the one from the previous locking mechanism 142, may be inserted into the align pin receiving aperture 246 and selected pin receiving bore 268 to lock the adjacent first and second sections 86, 88 at the corresponding pivot angle.

Figure 8:
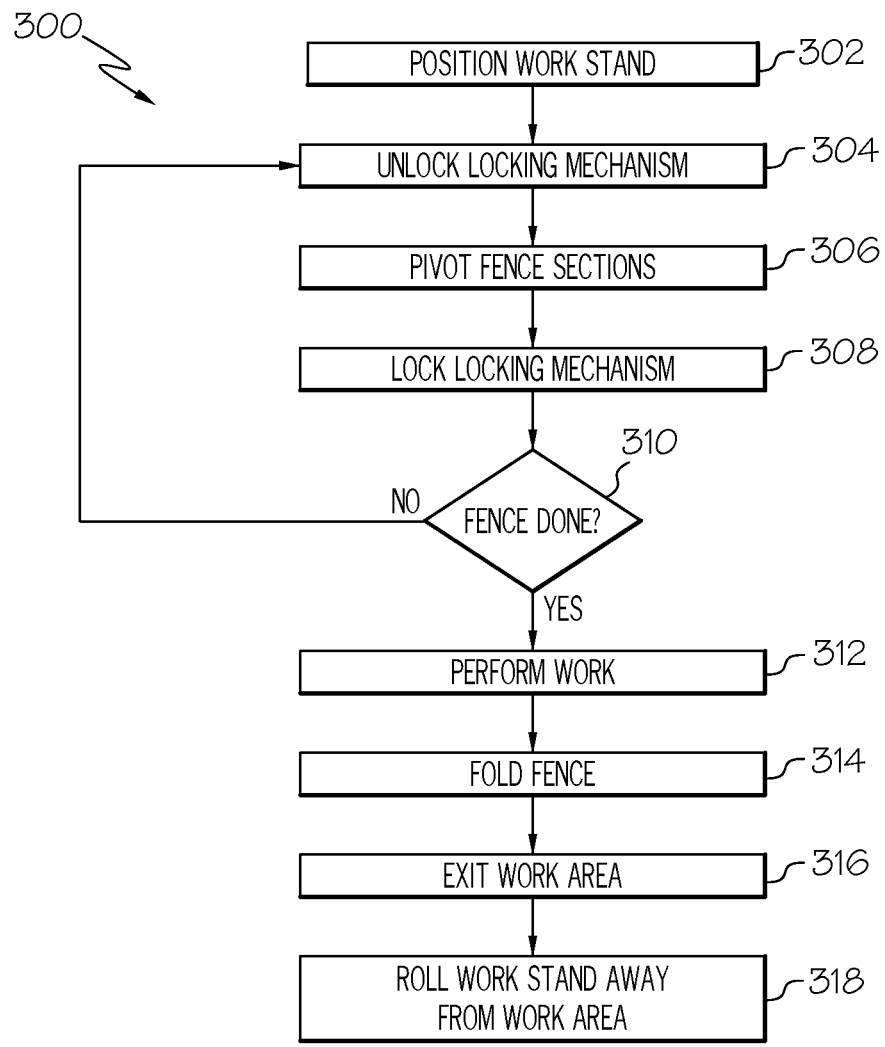
FIG. 8 is flow diagram of the method for using the mobile work stand of FIG. 1 for working on work areas.

FIG. 8 illustrates the method 300 for using a mobile work stand 20 for working on work areas. First, in step 302, the mobile work stand 20 is positioned at the work area 27 and the servicer walks up the stairs onto the platform. Then, in step 304, the servicer unlocks the locking mechanisms 142 for selected adjacent first and second fence sections 86, 88. Specifically, this is accomplished by the servicer depressing the push button 154 on the locking pin assembly 148 to retract the balls of the locking pin assembly 148 into the shaft 150. With balls 156 no longer interfering with the removal of the shaft 150, the servicer grasps the handle 152 and pulls out the shaft 150 from the aligned pin receiving aperture 146 of the locking plate 144 and selected pin receiving bore 168 of the flange member 162. The servicer then removes the lanyard 158 from the lanyard receiving bores 166. In step 306, the servicer then pivots the second fence section 88 relative to the first fence section 86 until the pin receiving aperture 146 of the locking plate 144 is aligned with a selected pin receiving bore 168 of the flange member 162. In step 308, the servicer then locks the locking mechanism. This is accomplished by depressing the push button 154 of the locking pin assembly 148 and inserting the shaft 150 through the pin receiving aperture 146 of the locking plate 144 and the selected pin receiving bore 168 of the flange member 162 until the balls 156 are located below the flange member 162. The servicer then releases the push button 154 such that the balls 156 extend out of the shaft 150 to prevent inadvertent removal of the locking pin assembly 148. The servicer then inserts the lanyard 158 through the lanyard receiving bores 166 until the plate 160 is located below the flange member 162. Then, in step 310, the servicer repeats steps 304 to 308 for additional adjacent first and second fence sections 86, 88 as required to configure and shape the fence 26 to enclose the work area 27. Then, in step 312, the servicer performs the work in the work area 27. After servicing or performing the work for that work area, the servicer then repeats steps 304 to 308 to fold the fence into a folded stowed position for storage as shown in FIG. 3 in step 314. In step 316, the servicer then exits the work area 27. Then, in step 318, the mobile work stand 20 is rolled away from the work area 27.

Hence, the mobile work stand allows a servicer to easily and safely reconfigured various fence configurations or positions to enclose a variety of work areas. For example, FIG. 1 shows the fence in a first position for enclosing the work area 27, and FIG. 2 shows the fence in a different second position to enclose a different configured work area 31. The servicer may configure the fence to enclose the work area while being safe and secure inside the fence and abiding by all Environment Health and Safety fall requirements. This mobile work stand also eliminates the need to tie a lanyard to the servicer and work area, and reduces the cost associated with designing and purchasing a tooling stand for every particular work area.

Figure 9:
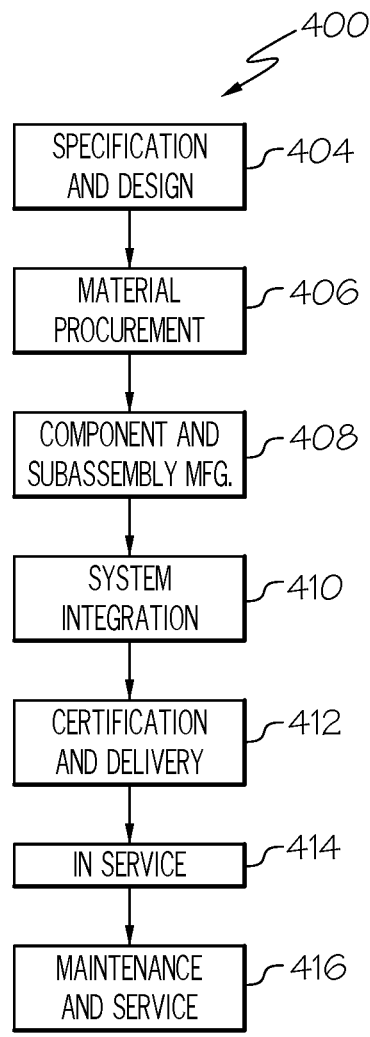
FIG. 9 is flow diagram of an aircraft manufacturing and service methodology.
Figure 10:
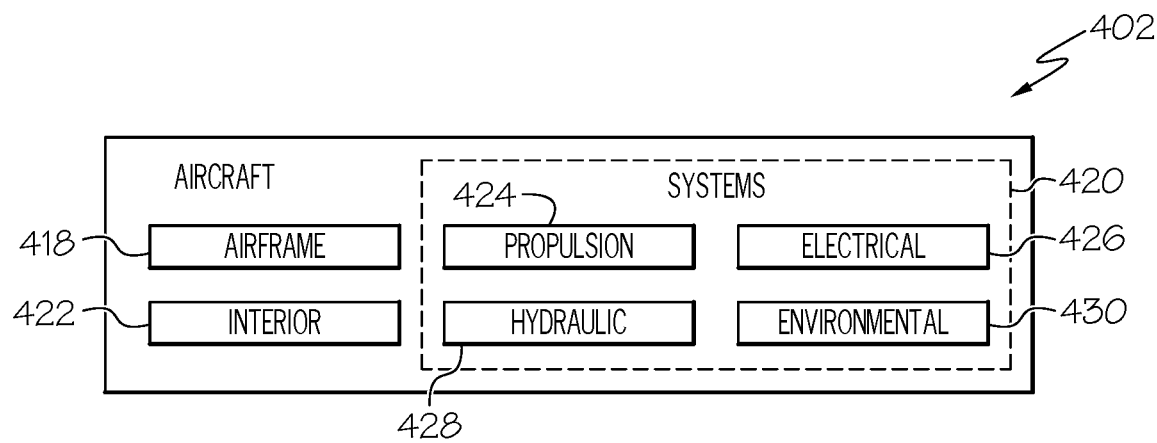
FIG. 10 is a block diagram of an aircraft.

Examples of the disclosure may be described in the context of an aircraft manufacturing and service method 400, as shown in FIG. 9, and an aircraft 402, as shown in FIG. 10. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed mobile work stand 20 may be employed during any one or more of the stages of the aircraft manufacturing and service method 400. As one example, the disclosed mobile work stand 20 may be employed during material procurement 406. As another example, components or subassemblies corresponding to component/subassembly manufacturing 408, system integration 410, and or maintenance and service 416 may be fabricated or manufactured using the disclosed fastening system. As another example, the airframe 418 and/or the interior 422 may be constructed using the disclosed fluid-tight mechanical fastening system. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed mobile work stand is described in the context of an aircraft; however, one of ordinary skill in the art will readily recognize that the work stand and associated method of using the mobile work stand to service a work area may be utilized for a variety of vehicles, as well as for non-vehicle applications. For example, implementations of the embodiments described herein may be implemented in any type of vehicle including, e.g., helicopters, passenger ships, automobiles and the like. Fence sections can be added and removed based on the size needed. Though, each stand may have a predetermined size and number of links within which it would be flexible. The stands could be procured in various sizes of fenced configurable areas. For example, a small fence might include 10 panels, a medium fence may include 14 panels, and a large fence may include 18 panels.

Although various embodiments of the disclosed mobile work stand have been shown and described, modifications may occur to those skilled in the art upon reading the specification. The present application includes such modifications and is limited only by the scope of the claims.

What is claimed is:
1. A mobile work stand comprising:
a plurality of fence sections connected consecutively from a first fence section to a last fence section, wherein the first fence section of the plurality of fence sections comprises a first rail extending in a first longitudinal direction, wherein a second fence section of the plurality of fence sections comprises a second rail extending in a second longitudinal direction, and wherein a third fence section of the plurality of fence sections comprises a third rail extending in a third longitudinal direction;
a first locking mechanism operatively connected to the first fence section and the second fence section and configured to move between a first locked configuration and a first unlocked configuration, wherein, in the first unlocked configuration, the first locking mechanism is configured to permit pivoting of the first fence section with respect to the second fence section while the first fence section is pivotally connected to the second fence section, and, in the first locked configuration, the first locking mechanism is configured to lock the first fence section and the second fence section at selected pivot angles with respect to each other such that the first and second fence sections cannot pivot with respect to each other;
a second locking mechanism operatively connected to the second fence section and the third fence section and configured to move between a second locked configuration and a second unlocked configuration, wherein, in the second unlocked configuration, the second locking mechanism is configured to permit pivoting of the second fence section with respect to the third fence section while the second fence section is pivotally connected to the third fence section, and, in the second locked configuration, the second locking mechanism is configured to lock the second fence section and the third fence section at selected pivot angles with respect to each other such that the second and third fence sections cannot pivot with respect to each other; and a base comprising a platform and defining an opening for a passageway over the platform, between a first portion of the base and a second portion of the base, and into a work area enclosed by the plurality of fence sections, wherein the first fence section is connected to the base at the first portion of the base, and wherein the last fence section is connected to the base at the second portion of the base, the base further comprising a staircase, the staircase enabling access to the passageway over the platform, between the first fence section and the last fence section, and into the work area enclosed by the plurality of fence sections.

2. The mobile work stand of claim 1 wherein the first locking mechanism comprises:

a first locking pin;

a first lock member, wherein the first lock member is operatively connected to the first fence section, wherein the first lock member comprises a first pin receiving aperture;

a second lock member, wherein the second lock member is operatively connected to the second fence section, wherein the second lock member comprises a first plurality of pin receiving bores, wherein a first pin receiving bore of the first plurality of pin receiving bores corresponds to a first pivot angle of the selected pivot angles of the first locking mechanism, and wherein a second pin receiving bore of the first plurality of pin receiving bores corresponds to a second pivot angle of the selected pivot angles of the first locking mechanism, wherein the first locking pin is configured to extend through the first pin receiving aperture of the first lock member and the first pin receiving bore of the second lock member to lock the first and second fence sections at the first pivot angle, and wherein the first locking pin is configured to extend through the first pin receiving aperture of the first lock member and the second pin receiving bore of the second lock member to lock the first and second fence sections at the second pivot angle.

3. The mobile work stand of claim 2 wherein the second locking mechanism comprises:

a second locking pin;

a third lock member, wherein the third lock member is operatively connected to the third fence section, wherein the third lock member comprises a second pin receiving aperture;

a fourth lock member, wherein the fourth lock member is operatively connected to the second fence section, wherein the fourth lock member comprises a second plurality of pin receiving bores, wherein a third pin receiving bore of the second plurality of pin receiving bores corresponds to a third pivot angle of the selected pivot angles of the second locking mechanism, and wherein a fourth pin receiving bore of the second plurality of pin receiving bores corresponds to a fourth pivot angle of the selected pivot angles of the second locking mechanism, wherein the second locking pin is configured to extend through the second pin receiving aperture of the third lock member and the third pin receiving bore of the fourth lock member to lock the second and third fence sections at the third pivot angle, and wherein the second locking pin is configured to extend through the second pin receiving aperture of the third lock member and the fourth pin receiving bore of the fourth lock member to lock the second and third fence sections at the fourth pivot angle.

4. The mobile work stand of claim 1 further comprising a first hinge pin, wherein the first fence section is pivotally connected to the second fence section about the first hinge pin such that the first and second rails are positionable with respect to each other at angles of greater than 90 degrees.

5. The mobile work stand of claim 4 further comprising a second hinge pin, wherein the second fence section is pivotally connected to the third fence section about the second hinge pin such that the second and third rails are positionable with respect to each other at angles of greater than 90 degrees.

6. The mobile work stand of claim 5 wherein the first fence section comprises:

the first rail being a first top rail extending in the first longitudinal direction;

a first bottom rail extending in the first longitudinal direction; and a first vertical post connecting between a bottom of the first top rail and a top of the first bottom rail, wherein the second fence section comprises:

the second rail being a second top rail extending in the second longitudinal direction;

a second bottom rail extending in the second longitudinal direction; and a second vertical post connecting between a bottom of the second top rail and a top of the second bottom rail, wherein the first hinge pin comprises a first head and a first shaft extending from the first head, the first head being disposed on an upper surface of the first top rail.

7. The mobile work stand of claim 6 wherein the third fence section comprises:

the third rail being a third top rail extending in the third longitudinal direction;

a third bottom rail extending in the third longitudinal direction; and a third vertical post connecting between a bottom of the third top rail and a top of the third bottom rail, wherein the second hinge pin comprises a second head and a second shaft extending from the second head, the second head being disposed on an upper surface of the third top rail.

8. The mobile work stand of claim 1, the base further comprising:

a first base rail fixedly connected to said platform and pivotably connected to said first fence section;

a second base rail fixedly connected to said platform and pivotably connected to said last fence section, said first base rail and said second base rail defining said passageway over said platform.

9. The mobile work stand of claim 1, the second rail of the second fence section comprising:

a horizontal top portion, the horizontal top portion including first and second outer horizontal top members and an inner horizontal top member, each of the first and second outer horizontal top members including an inner portion and an outer portion, wherein the inner horizontal top member is mounted on top of the inner portions of the first and second outer horizontal top members and extends between them;

a horizontal bottom portion, the horizontal bottom portion including first and second outer horizontal bottom members and an inner horizontal bottom member, each of the first and second outer horizontal bottom members including an inner portion and an outer portion, wherein the inner horizontal bottom member is mounted on an underside of the inner portions of the first and second outer horizontal bottom members and extends between them; and first and second vertical posts interconnecting the horizontal top portion and the horizontal bottom portion.

10. The mobile work stand of claim 9, wherein the first post is provided between the inner portion of the first outer horizontal top member and the inner portion of the first outer horizontal bottom member, and wherein the second post is provided between the inner portion of the second outer horizontal top member and the inner portion of the second outer horizontal bottom member.

11. The mobile work stand of claim 1, the first fence section comprising:
the first rail being a horizontal top rail;
a horizontal bottom rail; and
an inner vertical post and an outer vertical post interconnecting the horizontal top rail and the horizontal bottom rail.

12. The mobile work stand of claim 11, the first fence section further comprising another inner vertical post interconnecting the horizontal top rail and the horizontal bottom rail.

13. The mobile work stand of claim 1 wherein the plurality of fence sections are configured to be folded into a stowed position for storing the plurality of fence sections.

14. The mobile work stand of claim 1 wherein the work area enclosed by the plurality of fence sections is on part of an aircraft.

15. The mobile work stand of claim 1 wherein the base further comprises:
a bottom wall;
front and rear horizontal support members mounted on the bottom wall;
a first pair of front and rear vertical posts mounted on the front and rear horizontal support members near a first end of the bottom wall;
a second pair of front and rear vertical posts mounted on the front and rear horizontal support members near a second end of the bottom wall;
a third pair of front and rear vertical posts mounted on the front and rear horizontal support members between the first and second pairs of front and rear vertical posts, wherein a height of the front and rear vertical posts of the third pair of front and rear vertical posts is greater than a height of the front and rear vertical posts of the first and second pairs of front and rear vertical posts;
a front horizontal rail mounted on top of the front vertical posts of the first and second pairs of front and rear vertical posts and extends therebetween;
a rear horizontal rail mounted on top of the rear vertical posts of the first and second pairs of front and rear vertical posts and extends therebetween; and
horizontal cross bars extending between the front horizontal rail and the rear horizontal rail at a location of the first and third pair of front and rear vertical posts.

16. A method for using a mobile work stand for working on a work area, wherein the method comprises steps of:
positioning the mobile work stand of claim 1 at the work area; and
configuring the plurality of fence sections in a first position to enclose the work area by pivoting the plurality of fence sections with respect to each other.

17. The method of claim 16 further comprising the step of locking the plurality of fence sections in the first position.

18. The method of claim 16 further comprising the steps of:
folding the plurality of fence sections in a second position for storing the plurality of fence sections by pivoting the first and second fence sections at selected pivot angles with respect to each other; and
removing the mobile work stand from the work area.

19. The method of claim 16 wherein the step of configuring the plurality of fence sections in the first position is performed by a servicer inside the plurality of fence sections.

20. The method of claim 16 further comprising the steps of:
locking the plurality of fence sections in the first position;
working in the work area;
unlocking the plurality of fence sections from the first position;
folding the plurality of fence sections in a second position for storing the plurality of fence sections by pivoting the first and second fence sections at selected pivot angles with respect to each other;
locking the plurality of fence sections in the second position; and
removing the mobile work stand from the work area.

* * * * *